US011997989B1

(12) United States Patent
Chen

(10) Patent No.: US 11,997,989 B1
(45) Date of Patent: Jun. 4, 2024

(54) SOUND PICKUP DEVICE, PET TRAINING MONITOR AND TRAINING MONITORING METHOD THEREOF

(71) Applicant: Sheng Chen, Ningbo (CN)

(72) Inventor: Sheng Chen, Ningbo (CN)

( * ) Notice: Subject to any disclaimer, the term of this patent is extended or adjusted under 35 U.S.C. 154(b) by 0 days.

(21) Appl. No.: 18/092,456

(22) Filed: Jan. 3, 2023

(51) Int. Cl.
*A01K 29/00* (2006.01)
*A01K 15/02* (2006.01)

(52) U.S. Cl.
CPC .......... *A01K 29/005* (2013.01); *A01K 15/021* (2013.01)

(58) Field of Classification Search
CPC .. A01K 29/005; A01K 11/006; A01K 15/021; A01K 15/023; A01K 27/001; A01K 27/009; A01K 15/022; A01K 15/029; H04R 3/005; H04R 1/406; H04R 3/00; G06F 13/00
USPC ............... 119/421, 859, 721, 720, 908, 856; 340/573.3, 539.13, 573.1
See application file for complete search history.

(56) References Cited

U.S. PATENT DOCUMENTS

| | | | | |
|---|---|---|---|---|
| 2007/0123192 A1* | 5/2007 | Sinai | .................... | H04M 1/656 455/403 |
| 2011/0061605 A1* | 3/2011 | Hardi | .................... | A01K 27/009 340/573.3 |
| 2013/0058495 A1* | 3/2013 | Furst | .................... | H04R 3/00 381/80 |
| 2022/0129404 A1* | 4/2022 | Lovegrove | .......... | G06F 13/4068 |
| 2022/0183259 A1* | 6/2022 | Oswald | ................ | A01K 27/001 |

* cited by examiner

*Primary Examiner* — Peter M Poon
*Assistant Examiner* — Jeffrey R Larsen
(74) *Attorney, Agent, or Firm* — Jose Cherson Weissbrot

(57) ABSTRACT

The present invention discloses a sound pickup device, a pet training monitor and a training monitoring method thereof. The sound pickup device comprises a single chip microcomputer, a digital silicon microphone, a wireless module and a power supply, wherein the single chip microcomputer is provided with a power supply interface and an SPI communication interface simulating a communication interface of the digital silicon microphone, and the SPI communication interface is connected with a clock pin and a data pin of the digital silicon microphone to collect single-channel audio data of the digital silicon microphone; the single-channel audio data is converted into PCM audio data by the single chip microcomputer, the single chip microcomputer is connected with an communication interface of the wireless module to transmit the PCM audio data, and an output end of the power supply is connected with the power interface of the single chip microcomputer to supply power to the single chip microcomputer. In this way, the sound pickup device, the pet training monitor and the training monitoring method thereof provided by the present invention have the characteristics of low cost, low energy consumption, small volume and the like, and can realize the functions of real-time voice and conditioned reflex training for a pet, thereby greatly expanding the management means of breeders for a pet.

8 Claims, 6 Drawing Sheets

SOUND PICKUP DEVICE, PET TRAINING MONITOR AND TRAINING MONITORING METHOD THEREOF

TECHNICAL FIELD

The present invention relates to the technical field of dog training equipment, in particular to a sound pickup device, a pet training monitor and a training monitoring method thereof.

BACKGROUND

With the continuous development of economy and society, more and more people keep pets, and they often regard pets as important members of their families. Because of the characteristics of pet dogs, owners need to take their dogs outdoors to walk their dogs every day. Once a puppy runs out of the house and is not tied with a leash, it often runs happily because it gets carried away. At this time, some owners often follow behind, but for some people who are slow to move, they can only run around. If a dog runs far away, it can only be called back by shouting. For some dogs that run far away, the owner's voice becomes weak. In this case, if the dog cannot be recalled in time, it will easily lead to the loss of the dog.

At the same time, with the increasing number of pet families, the demand for enhancing the communication between owners and pets and regulating the behavior of pets is increasing. Therefore, pet trainer has become an auxiliary tool for ordinary families to train pets.

Most products of the existing pet trainer do not have the function of voice playing. Although some products have the function of playing the pre-stored voice, they can't give the real-time command voice to the pet directly when it runs away. Of course, some products have the function of real-time voice playing, but their size is large, which increases the burden after the pet wears it, and the cost and power consumption are relatively high, so they are not suitable for ordinary families. At the same time, the function is relatively simple, which greatly limits the pet breeder's management means for pets.

SUMMARY

In view of at least one of the above problems, the purpose of the present disclosure is to provide a sound pickup device, a pet training monitor and a training monitoring method thereof, which can communicate with a pet in real time, and have the characteristics of low cost and low energy consumption, etc., thus solving the problem of large volume and providing conditions for reducing product volume and burden on pets.

To achieve the above purpose, the present disclosure provides a sound pickup device, including a single chip microcomputer, a digital silicon microphone, a wireless module and a power supply, wherein the single chip microcomputer is provided with a power supply interface and an SPI communication interface simulating a communication interface of the digital silicon microphone; the SPI communication interface is connected with a clock pin and a data pin of the digital silicon microphone to collect single-channel audio data of the digital silicon microphone; the single-channel audio data is converted into PCM audio data by the single chip microcomputer; the single chip microcomputer is connected with an communication interface of the wireless module to transmit the PCM audio data; and an output end of the power supply is connected with the power interface of the single chip microcomputer to supply power to the single chip microcomputer.

Optionally, the digital silicon microphone outputs dual-channel audio data in PDM format, and the single chip microcomputer receives the audio data of one channel of the dual-channel audio data to form the single-channel audio data.

Optionally, the SPI communication interface comprises an SPI1 CLK pin and an SPI1 MISO pin, and the clock pin and the data pin of the digital silicon microphone are connected with the SPI1 CLK pin and the SPI1 MISO pin respectively.

Optionally, the wireless module comprises a wireless signal amplification module and a wireless transceiver chip which are electrically connected.

Optionally, the single chip microcomputer further comprises a WX-POWER pin, a CE pin, a CEN pin, an SCK pin, a MOSI pin, a MISO pin and an IRO pin; the wireless signal amplification module is connected with the WX-POWER pin, and the wireless transceiver chip is connected with the CE pin, the CEN pin, the SCK pin, the MOSI pin, the MISO pin and the IRO pin.

To achieve the above purpose, the present disclosure further provides a pet training monitor, including a handheld terminal and a receiving terminal which are in communication connection, wherein the handheld terminal includes the above sound pickup device, and the receiving terminal is used for a pet to wear and remotely receive different signals sent by the handheld terminal to trigger corresponding functions;

the handheld terminal comprises a handheld shell, a LCD screen and keys arranged on the handheld shell, a first single chip microcomputer, a first power supply, a first wireless module and a digital silicon microphone arranged inside the handheld shell, wherein the first single chip microcomputer, the first power supply, the first wireless module and the digital silicon microphone form the sound pickup device; the first single chip microcomputer is electrically connected with the LCD screen and the keys respectively; and the single chip microcomputer collects different signals sent by the digital silicon microphone and/or the keys and sends the signals to the receiving terminal by the first wireless module;

the receiving terminal comprises a receiving shell, a speaker arranged on the receiving shell, a second single chip microcomputer arranged inside the receiving shell, a second power supply, a second wireless module, a command unit and an audio amplification module, wherein the second single chip microcomputer is electrically connected with the second power supply and the command unit respectively; the speaker is electrically connected with the second wireless module by the audio amplification module; and the second wireless module receives different signals from the handheld terminal, and generates corresponding commands through the command unit and the second single chip microcomputer.

Optionally, both the first power supply and the second power supply comprise a lithium battery, a charging module and a battery management and protection module which are electrically connected.

Optionally, the command unit at least comprises a vibration module, an electric shock module and an acousto-optic alarm module, and the input ends of the vibration module, the electric shock module and the acousto-optic alarm module are connected with the single chip microcomputer.

To achieve the above purpose, the present disclosure further provides a training monitoring method of a pet training monitor, wherein the above pet training monitor is adopted; the pet training monitor includes a handheld terminal with a sound pickup device and a receiving terminal in communication with the handheld terminal, and the training monitoring method comprises real-time voice and conditioned reflex training for a pet.

Optionally, the method of real-time voice for a pet is as follows:
- sending out voice by a breeder through the keys at the handheld terminal, and the digital silicon microphone of the sound pickup device inputting the voice and outputting dual-channel audio signals in a PDM format;
- receiving the audio data of one channel of the two-channel audio data by the first single chip microcomputer to form single-channel audio data, collecting the single-channel audio signal by the first single chip microcomputer, converting the signal into a PCM audio data signal, and then sending the PCM audio data signal to the receiving terminal through the first wireless module;
- the second wireless module at the receiving terminal receiving the PCM audio data signal from the first wireless module, and directly transmitting the PCM audio data signal to the speaker through the audio amplification module for external playback, thus realizing voice communication with the pet.

Optionally, the method of conditioned reflex training for a pet is as follows:
- the breeder setting a movement range of the pet at the handheld terminal through the keys;
- the breeder sending out different signals through the keys when the movement range of the pet exceeds a set value;
- collecting different signals by the first single chip microcomputer, and sending the different signals to the receiving terminal by the first wireless module;
- the second wireless module at the receiving terminal receiving the different signals from the first wireless module, the second single chip microcomputer at the receiving terminal collecting the different signals, and controlling the acousto-optic alarm module, the vibration module and/or the electric shock module arranged in the command unit to issue corresponding commands to remind the pet in a form of sound, slight vibration and/or slight electric shock so as to form conditioned reflex.

The disclosed sound pickup device, the pet training monitor and the training monitoring method thereof have the advantages that the sound pickup device adopts a single chip microcomputer and a digital silicon microphone, which has the characteristics of low cost, low energy consumption and the like, and the digital silicon microphone has a small volume, thus providing conditions for reducing the product volume and the burden on pets, but the sound pickup direction is more obvious, so that the noise isolation ability to the outside is stronger, and the breeder can make real-time voice to the pet wearing the receiving terminal through the handheld terminal equipped with the sound pickup device, thereby realizing the goal of the breeder.

BRIEF DESCRIPTION OF DRAWINGS

The accompanying drawings illustrate exemplary embodiments of the present disclosure, and together with their descriptions, serve to explain the principles of the present disclosure. These drawings are included to provide a further understanding of the present disclosure, and are included in and constitute a part of this specification.

Figure 1:
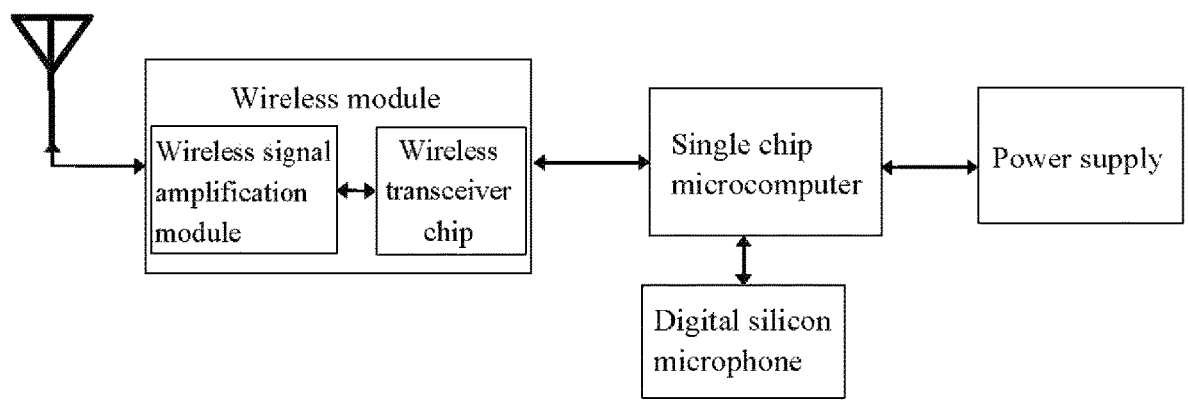
FIG. 1 is the structural connection block diagram of the sound pickup device.

Reference signs in the figures: 1. Handheld terminal; 2. Receiving terminal; 101. Handheld shell; 102. LCD screen; 103. Key; 201. Receiving shell; 202. Speaker.

DESCRIPTION OF EMBODIMENTS

The present disclosure will be further explained in detail with reference to the following drawings and examples. It is to be understood that the specific embodiments described here are only used to explain the relevant contents, but not to limit the present disclosure. In addition, for convenience of description, only the parts related to this disclosure are shown in the drawings.

It should be noted that the embodiments in this disclosure and the features in the embodiments can be combined with each other without conflict. The present disclosure will be described in detail with reference to the drawings and examples.

Figure 2:
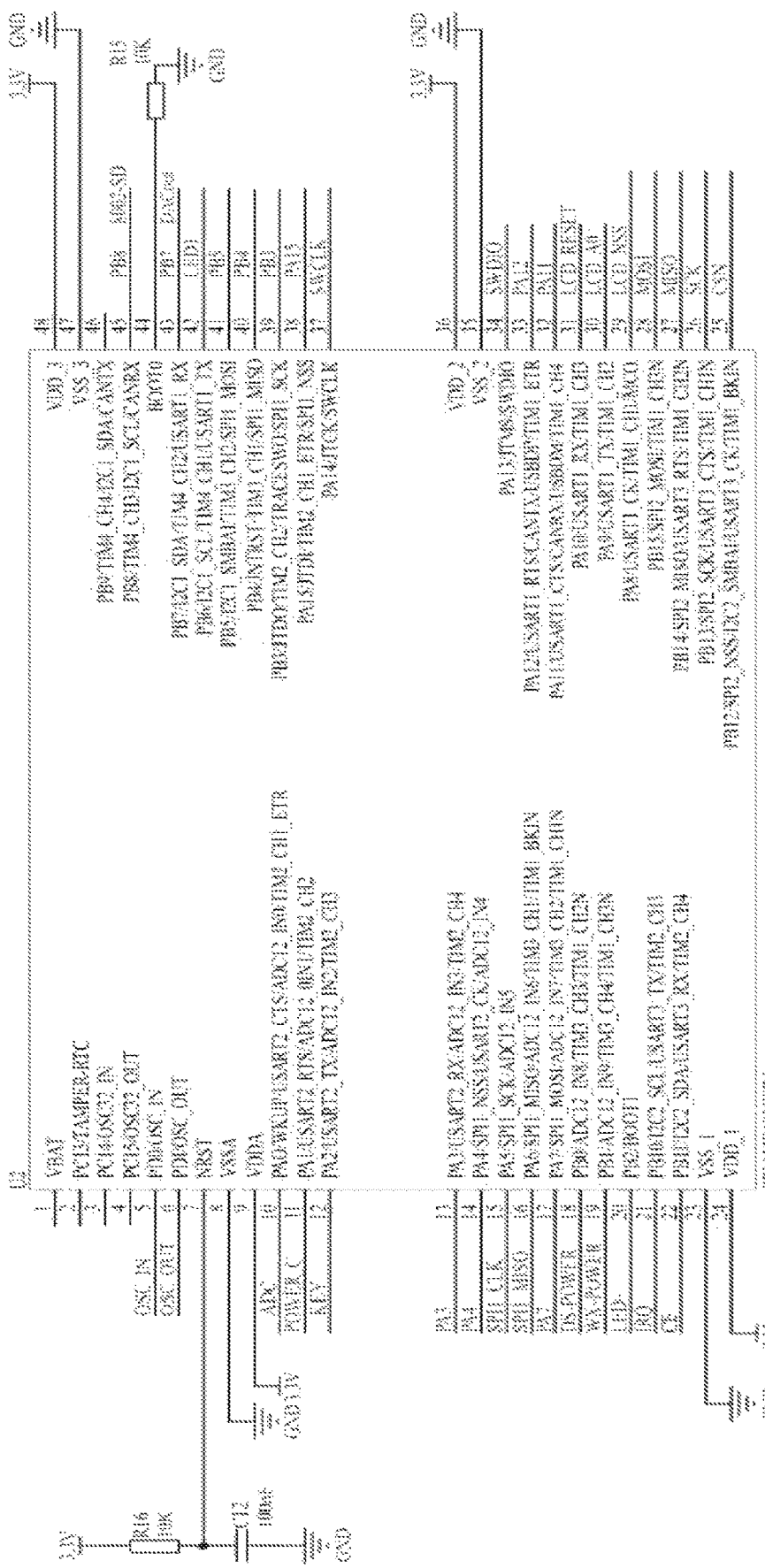
FIG. 2 is a circuit diagram of the single chip microcomputer in FIG. 1.
Figure 3:
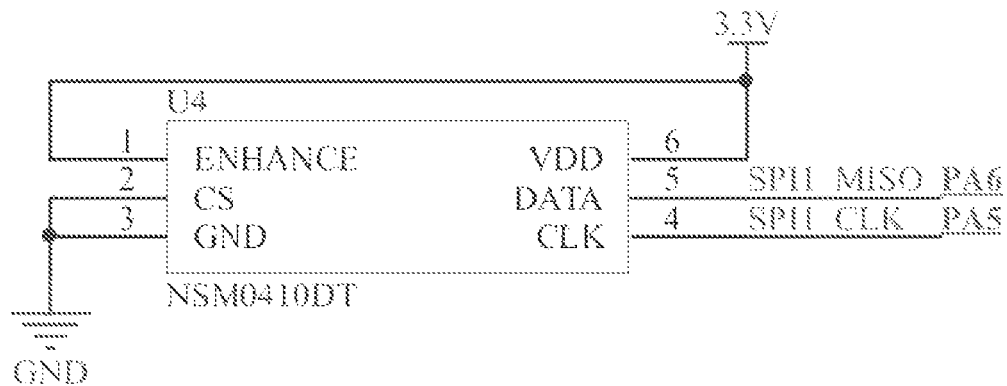
FIG. 3 is a circuit diagram of the digital silicon microphone in FIG. 1.
Figure 4:
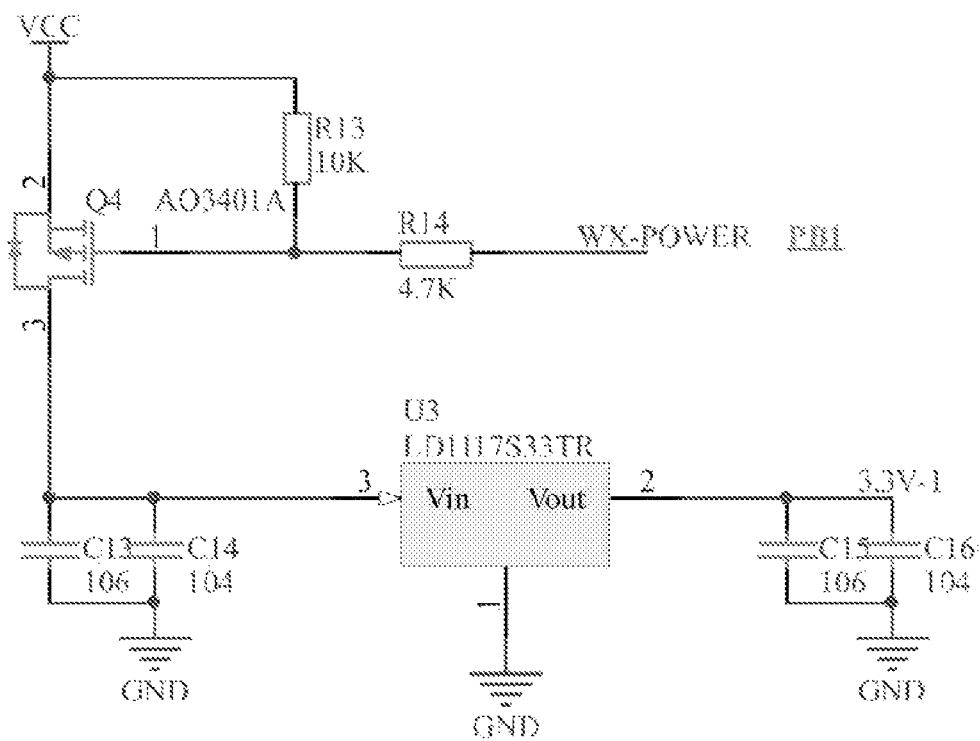
FIG. 4 is a circuit diagram of a wireless signal amplification module in the wireless module of FIG. 1.
Figure 5:
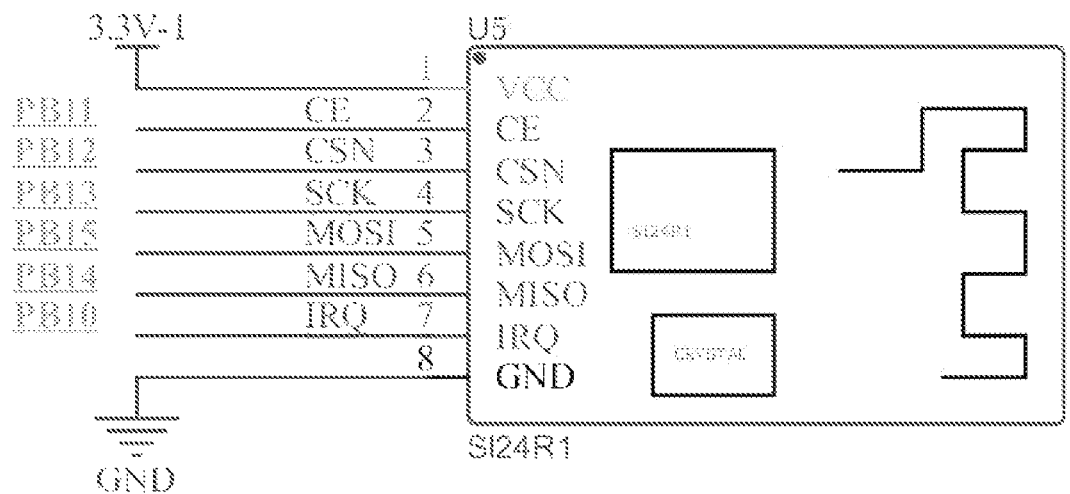
FIG. 5 is a circuit diagram of a wireless transceiver chip in the wireless module of FIG. 1.

Referring to FIGS. 1 to 5, this embodiment includes:
a sound pickup device including a single chip microcomputer, a digital silicon microphone, a wireless module and a power supply, wherein the single chip microcomputer is provided with a power supply interface and an SPI communication interface simulating a communication interface of the digital silicon microphone; the SPI communication interface is connected with a clock pin and a data pin of the digital silicon microphone to collect single-channel audio data of the digital silicon microphone; the single-channel audio data is converted into PCM audio data by the single chip microcomputer; the single chip microcomputer is connected with an communication interface of the wireless module to transmit the PCM audio data; and an output end of the power supply is connected with the power interface of the single chip microcomputer to supply power to the single chip microcomputer.

The SPI communication interface includes a SPI1 CLK pin and a SPI1 MISO pin, and the clock pin and data pin of digital silicon chip are connected with the SPI1 CLK pin and SPI1 MISO pin respectively. The present invention adopts low-cost digital silicon microphone acquisition to input sound, and outputs dual-channel audio data in a PDM format, while the single chip microcomputer only receives the audio data of one channel of the dual-channel audio data to form single-channel audio data.

The above-mentioned single chip microcomputer and digital silicon microphone have the characteristics of low cost and energy consumption, and the digital silicon microphone has a small volume, which provides conditions for reducing product volume and pet burden. The sound pickup device is mainly realized by the digital silicon microphone, and since the low-cost single chip microcomputer is used, so it does not have the ability to directly obtain digital silicon microphone data. The single-channel audio data of digital silicon microphone can be read through the SPI1 CLK pin and SPI1 MISO pin in the SPI communication interface of the single chip microcomputer with a SPI read-write program, and then the data can be converted into a PCM audio data signal through software decoding of the single chip microcomputer, and finally the PCM audio data signal is sent to the wireless module for transmission.

At the same time, compared with commonly used electrets, digital silicon microphone has the advantages of small size and convenient welding, and its pickup directivity is more obvious than that of electrets, which makes it more capable of isolating external noise.

The wireless module includes a wireless signal amplification module and a wireless transceiver chip which are electrically connected, and is used for receiving and sending signals to form a wireless communication mode, and has good anti-interference ability. The single chip microcomputer also includes a WX-POWER pin, a CE pin, a CEN pin, a SCK pin, a MOSI pin, a MISO pin and an IRO pin, wherein the wireless signal amplification module is connected with the WX-POWER pin, and the wireless transceiver chip is connected with the CE pin, the CEN pin, the SCK pin, the MOSI pin, the MISO pin and the IRO pin respectively.

Figure 6:
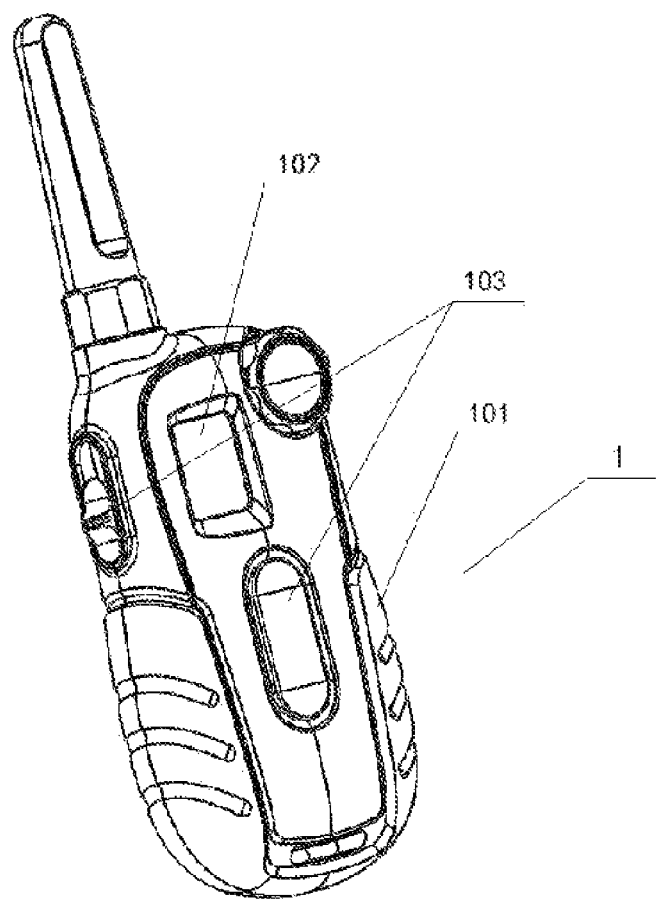
FIG. 6 is the outline structure diagram of the handheld terminal of the pet training monitor.
Figure 7:
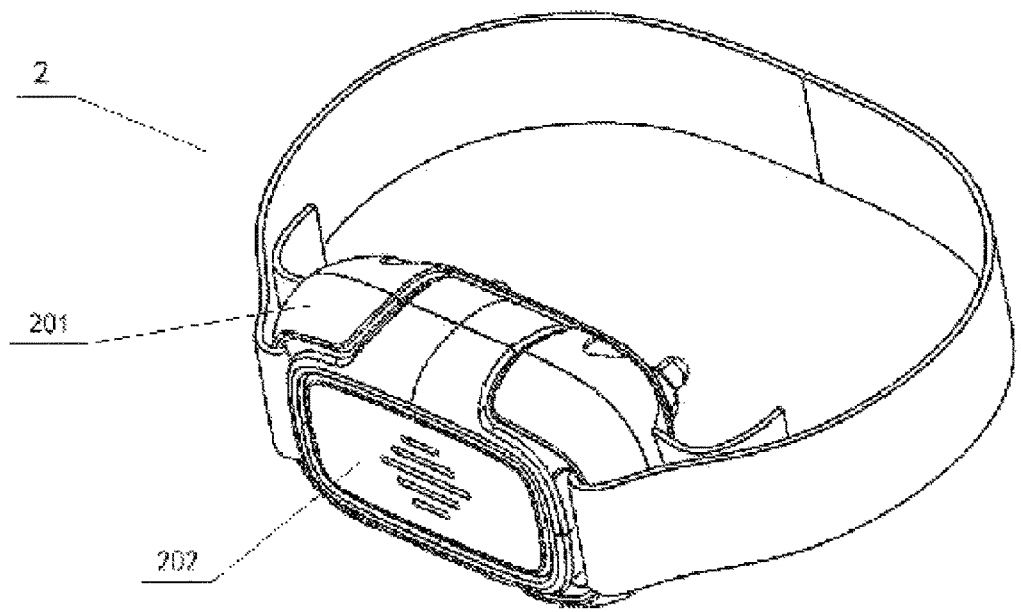
FIG. 7 is a schematic diagram of the external structure of the receiving terminal of the pet training monitor.
Figure 8:
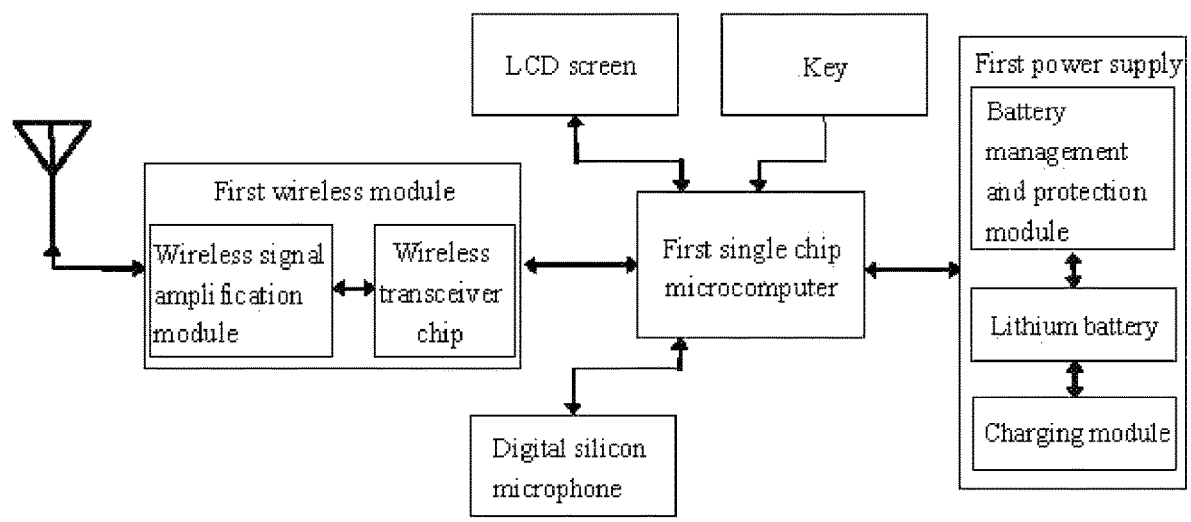
FIG. 8 is a connection block diagram of the internal structure of the handheld terminal in FIG. 7.
Figure 9:
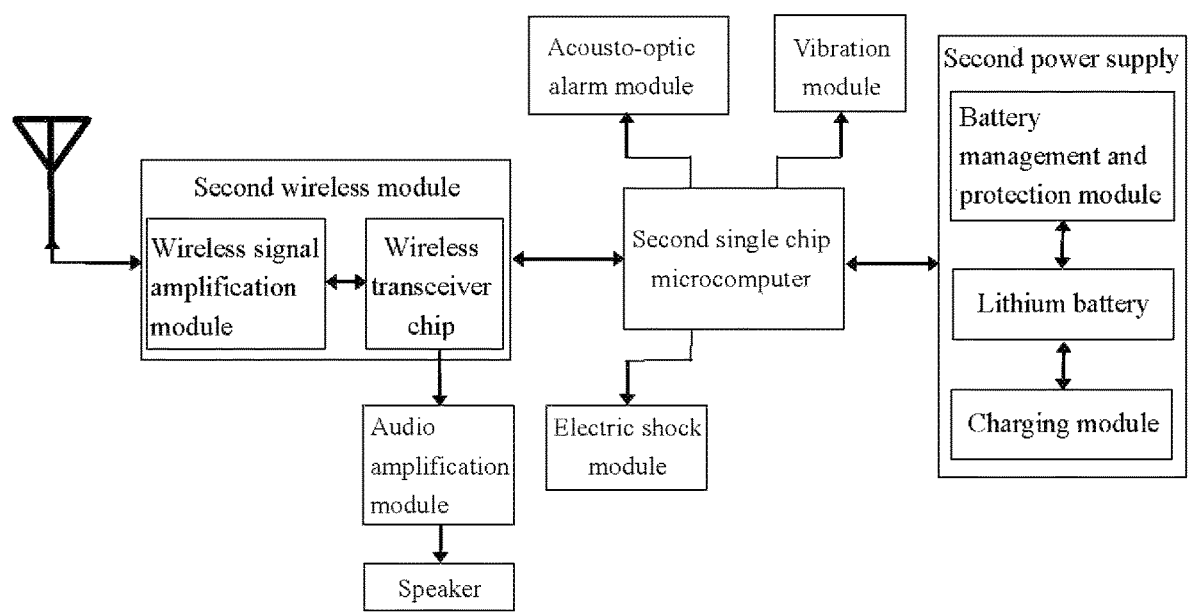
FIG. 9 is a connection block diagram of the internal structure of the receiving terminal in FIG. 7.

Referring to FIGS. 6 to 9, this embodiment includes:
a pet training monitor including a handheld terminal 1 and a receiving terminal 2 which are connected in communication, wherein the handheld terminal 1 includes the above sound pickup device, and the receiving terminal 2 is used for a pet to wear and remotely receive different signals sent by the handheld terminal 1 to trigger corresponding functions.

The handheld terminal 1 includes a handheld housing 101, a LCD screen 102 and keys 103 arranged on the handheld housing 101, a first single chip microcomputer, a first power supply, a first wireless module and a digital silicon microphone arranged inside the handheld housing 101. Among them, the first single chip microcomputer, the first power supply, the first wireless module and the digital silicon microphone form the sound pickup device. The first single chip microcomputer is electrically connected with the LCD screen 102 and the keys 103, respectively. The first single chip microcomputer collects different signals from the digital silicon microphone and/or the keys 103 and sends them to the receiving terminal 2 through the first wireless module.

The receiving terminal 2 includes a receiving housing 201, a speaker 202 arranged on the receiving housing 201, a second single chip microcomputer, a second power supply, a second wireless module, a command unit and an audio amplification module arranged inside the receiving housing 201. Among them, the second single chip microcomputer is electrically connected with the second power supply and the command unit respectively, the speaker 202 is electrically connected with the second wireless module through the audio amplification module, and the second wireless module receives different signals from the handheld terminal 1 and generates corresponding commands through the command unit and the second single chip microcomputer.

The first power supply and the second power supply both include a lithium battery, a charging module and a battery management and protection module which are electrically connected. The charging module charges the lithium battery, and at the same time, the battery management and protection module protects the lithium battery, so that the safety performance is improved and problems such as explosion or electric leakage are not easy to occur. The whole trainer is powered by the lithium battery.

Among them, the command unit at least includes a vibration module, an electric shock module and an acousto-optic alarm module, and the input ends of the vibration module, the electric shock module and the acousto-optic alarm module are connected with the single chip microcomputer. The vibration module, electric shock module and acousto-optic alarm module are used to send out vibration, electric shock, sound and other commands, so as to realize slight electric shock warning, vibration warning and acousto-optic alarm warning, so that pets can realize the corresponding relationship between movement range and warning, and thus form conditioned reflex.

The keys at least include an intensity key, a vibration key, an electric shock key, a voice key and a setting key; the intensity key is used to control the intensity of vibration, electric shock and sound, the vibration key and electric shock key are used to send out vibration commands and electric shock commands respectively, the voice key is used to turn on the digital silicon microphone for a pickup mode, and the setting key is used to set information such as pet information and pet movement range.

The present disclosure also provides a training monitoring method of a pet training monitor, which adopts the above pet training monitor, and the pet training monitor includes a handheld terminal 1 with a sound pickup device and a receiving terminal 2 which is in communication connection with the handheld terminal 1, and the training monitoring method includes real-time voice and conditioned reflex training for a pet.

The method of real-time voice for a pet is as follows:
sending out voice by a breeder through the keys 103 at the handheld terminal 1, and the digital silicon microphone of the sound pickup device inputting the voice and outputting dual-channel audio signals in a PDM format;

receiving the audio data of one channel of the two-channel audio data by the first single chip microcomputer to form single-channel audio data, collecting the single-channel audio signal by the first single chip microcomputer, converting the signal into a PCM audio data signal, and then sending the PCM audio data signal to the receiving terminal 2 through the first wireless module;

the second wireless module at the receiving terminal 2 receiving the PCM audio data signal from the first wireless module, and directly transmitting the PCM audio data signal to the speaker 202 through the audio amplification module for external playback, thus realizing voice communication with the pet.

Aiming at the problem that most of the existing products do not have the voice playing function, and some products have the function of playing the pre-stored voice, when the pet runs away, it cannot directly send the real-time command voice, the handheld terminal 1 directly sends the real-time voice through the digital silicon microphone, and the receiving terminal 2 plays it out through the speaker 202, thus realizing the direct voice communication between the breeder and the pet.

The method of conditioning training for a pet is as follows:

the breeder setting a movement range of the pet at the handheld terminal 1c through the keys 103;

the breeder sending out different signals through the keys 103 when the movement range of the pet exceeds a set value;

collecting different signals by the first single chip microcomputer, and sending the different signals to the receiving terminal 2 by the first wireless module;

the second wireless module at the receiving terminal 2 receiving the different signals from the first wireless module, the second single chip microcomputer at the receiving terminal 2 collecting the different signals, and controlling the acousto-optic alarm module, the vibration module and/or the electric shock module arranged in the command unit to issue corresponding commands to remind the pet in a form of sound, slight vibration and/or slight electric shock so as to form conditioned reflex.

Aiming at the problem that the existing products cannot train pets in conditioned reflex, the acousto-optic alarm module, the vibration module and the electric shock module at the receiving terminal 2 can realize the acousto-optic alarm reminder, the slight electric shock reminder and the vibration reminder, so that pets can realize the corresponding relationship between the movement range and the reminder, and thus form conditioned reflex.

Compared with the prior art, the present invention has the following advantages:

1. the sound pickup device adopts low-cost digital silicon microphone and single chip microcomputer, which has the characteristics of low cost and low energy consumption, and provides conditions for reducing product volume and burden on pets;
2. by the handheld terminal with the sound pickup device, the digital silicon microphone directly sends real-time voice, and the receiving terminal directly receives the voice and plays it out through the speaker, thus realizing the direct voice communication between the breeder and the pet;
3. by the acousto-optic alarm module, the vibration module and the electric shock module at the receiving terminal, the acousto-optic alarm reminder, the slight electric shock reminder and the vibration reminder can be realized, so that pets can realize the corresponding relationship between the range of motion and the reminder, thus allowing pets to form conditioned reflex.

To sum up, the breeder realizes the different functions of the handheld terminal controlled by the keys of the handheld terminal equipped with the sound pickup device combined with the contents displayed on the LCD screen, and the receiving terminal generates corresponding functions (vibration, electric shock, sound) according to the different signals received from the handheld terminal, which can realize the functions of real-time voice and conditioned reflex training for pets, thus greatly expanding the breeder's management means for pets.

It should be understood by those skilled in the art that the above-mentioned embodiments are only to clearly illustrate the present disclosure, but not to limit the scope of the present disclosure. For those skilled in the art, other changes or modifications can be made on the basis of the above disclosure, and these changes or modifications are still within the scope of this disclosure.

What is claimed is:

1. A sound pickup device, comprising a single chip microcomputer, a digital silicon microphone, a wireless module and a power supply, wherein the single chip microcomputer is provided with a power supply interface and an SPI communication interface simulating a communication interface of the digital silicon microphone; the SPI communication interface is connected with a clock pin and a data pin of the digital silicon microphone to collect single-channel audio data of the digital silicon microphone; the single-channel audio data is converted into PCM audio data by the single chip microcomputer; the single chip microcomputer is connected with an communication interface of the wireless module to transmit the PCM audio data; and an output end of the power supply is connected with the power interface of the single chip microcomputer to supply power to the single chip microcomputer, wherein the single chip microcomputer further comprises a WX-POWER pin, a CE pin, a CEN pin, an SCK pin, a MOSI pin, a MISO pin and an IRO pin; the wireless module comprises a wireless signal amplification module and a wireless transceiver chip which are electrically connected; the wireless signal amplification module is connected with the WX-POWER pin, and the wireless transceiver chip is connected with the CE pin, the CEN pin, the SCK pin, the MOSI pin, the MISO pin and the IRO pin.

2. The sound pickup device according to claim 1, wherein the digital silicon microphone outputs dual-channel audio data in PDM format, and the single chip microcomputer receives the audio data of one channel of the dual-channel audio data to form the single-channel audio data.

3. The sound pickup device according to claim 1, wherein the SPI communication interface comprises an SPI1 CLK pin and an SPI1 MISO pin, and the clock pin and the data pin of the digital silicon microphone are connected with the SPI1 CLK pin and the SPIT MISO pin respectively.

4. A pet training monitor, comprising a handheld terminal and a receiving terminal which are in communication connection, wherein the handheld terminal comprises a sound pickup device, and the receiving terminal is used for a pet to wear and remotely receive different signals sent by the handheld terminal to trigger corresponding functions;

the handheld terminal comprises a handheld shell, a LCD screen and keys arranged on the handheld shell, a first single chip microcomputer, a first power supply, a first wireless module and a digital silicon microphone arranged inside the handheld shell, wherein the first single chip microcomputer, the first power supply, the first wireless module and the digital silicon microphone form the sound pickup device; the first single chip microcomputer is electrically connected with the LCD screen and the keys respectively; and the first single chip microcomputer collects the different signals sent by the digital silicon microphone and/or the keys and sends the signals to the receiving terminal by the first wireless module; the first single chip microcomputer further comprises a WX-POWER pin, a CE pin, a CEN pin, an SCK pin, a MOSI pin, a MISO pin and an IRO pin; the first wireless module comprises a wireless signal amplification module and a wireless transceiver chip which are electrically connected; the wireless signal amplification module is connected with the WX-POWER pin, and the wireless transceiver chip is connected with the CE pin, the CEN pin, the SCK pin, the MOSI pin, the MISO pin and the IRO pin, the receiving terminal comprises a receiving shell, a speaker arranged on the receiving shell, a second single chip microcomputer arranged inside the receiving shell, a second power supply, a second wireless module, a command unit and an audio amplification module, wherein the second single chip microcomputer is electrically connected with the second power supply and the command unit respectively; the speaker is electrically connected with the second wireless module by the audio amplification module; and the second wireless module receives the different signals from the handheld terminal, and generates corresponding commands through the command unit and the second single chip microcomputer.

5. The pet training monitor according to claim 4, wherein both the first power supply and the second power supply comprise a lithium battery, a charging module and a battery management and protection module which are electrically connected.

6. The pet training monitor according to claim 4, wherein the command unit at least comprises a vibration module, an electric shock module and an acousto-optic alarm module, and an input ends of the vibration module, the electric shock module and the acousto-optic alarm module are connected with the single chip microcomputer.

7. A training monitoring method of a pet training monitor, wherein the pet training monitor comprises a handheld terminal with a sound pickup device and a receiving terminal in communication with the handheld terminal, and the training monitoring method comprises real-time voice and conditioned reflex training for a pet, wherein the real-time voice and conditioned reflex training for a pet comprising:

sending out voice by a breeder through the keys at the handheld terminal, and the digital silicon microphone of the sound pickup device inputting the voice and outputting dual-channel audio signals in a PDM format, receiving the audio data of one channel of the two-channel audio data by a first single chip microcomputer to form a single-channel audio data, collecting the single-channel audio signal by the first single chip microcomputer, converting the signal into a PCM audio data signal, and then sending the PCM audio data signal to the receiving terminal through the first wireless module;

a second wireless module at the receiving terminal receiving the PCM audio data signal from a first wireless module, and directly transmitting the PCM audio data signal to a speaker through the audio amplification module for external playback, thus realizing voice communication with the pet;

wherein the first single chip microcomputer further comprises a WX-POWER pin, a CE pin, a CEA pin, an SCK pin, a MOST pin, a MISO pin and an IRO pin, the first wireless module comprises a wireless signal amplification module and a wireless transceiver chip which are electrically connected;

the wireless signal amplification module is connected with the WX-POWER pin, and the wireless transceiver chip is connected with the CE pin, the CEN pin, the SCK pin, the MOSI pin, the MISO pin and the IRO pin.

8. The training monitoring method of a pet training monitor according to claim 7, wherein the breeder setting a movement range of the pet at the handheld terminal through the keys;

the breeder sending out different signals through the keys when the movement range of the pet exceeds a set value;

collecting the different signals by the first single chip microcomputer, and sending the different signals to the receiving terminal by the first wireless module;

the second wireless module at the receiving terminal receiving the different signals from the first wireless module, the second single chip microcomputer at the receiving terminal collecting the different signals, and controlling an acousto-optic alarm module, a vibration module and/or an electric shock module arranged in a command unit to issue corresponding commands to remind the pet in a form of sound, slight vibration and/or slight electric shock so as to form conditioned reflex.

* * * * *